United States Patent
Mochizuki et al.

(10) Patent No.: US 10,543,401 B2
(45) Date of Patent: Jan. 28, 2020

(54) RESIN COMPOSITION FOR GOLF BALLS, AND GOLF BALL

(71) Applicant: Bridgestone Sports Co., Ltd., Tokyo (JP)

(72) Inventors: Katsunobu Mochizuki, Chichibushi (JP); Masahiro Yamabe, Chichibushi (JP); Atsushi Namba, Chichibushi (JP)

(73) Assignee: Bridgestone Sports Co., Ltd., Minato-ku, Tokyo (JP)

( * ) Notice: Subject to any disclaimer, the term of this patent is extended or adjusted under 35 U.S.C. 154(b) by 0 days.

(21) Appl. No.: 16/014,058

(22) Filed: Jun. 21, 2018

(65) Prior Publication Data

US 2018/0369650 A1    Dec. 27, 2018

(30) Foreign Application Priority Data

Jun. 22, 2017    (JP) .................. 2017-122257

(51) Int. Cl.
| | |
|---|---|
| *A63B 37/06* | (2006.01) |
| *A63B 37/00* | (2006.01) |
| *C08L 39/00* | (2006.01) |
| *C08L 75/04* | (2006.01) |

(52) U.S. Cl.
CPC ...... *A63B 37/0058* (2013.01); *A63B 37/0027* (2013.01); *C08L 39/00* (2013.01); *C08L 75/04* (2013.01); *C08F 2500/02* (2013.01); *C08F 2500/03* (2013.01); *C08F 2800/20* (2013.01)

(58) Field of Classification Search
CPC .................................. A63B 37/0023
USPC .......................................... 473/378
See application file for complete search history.

(56) References Cited

U.S. PATENT DOCUMENTS

2015/0368452 A1* 12/2015 Nanba ............... C08L 67/02
                                                    525/221

FOREIGN PATENT DOCUMENTS

JP    5-068724 A    3/1993

* cited by examiner

*Primary Examiner* — Raeann Gorden
(74) *Attorney, Agent, or Firm* — Sughrue Mion, PLLC

(57) ABSTRACT

A resin composition for golf balls includes specific amounts of (A) polyurethane or polyurea and (B) an oxazoline group-containing acrylic polymer or an oxazoline group-containing styrene polymer. A golf ball having a core encased by a cover of one or more layers, wherein at least one cover layer is formed of this resin composition, exhibits a good adhesion between adjoining layers, enabling the ball to achieve a high scuff resistance without lowering the initial velocity of the ball.

13 Claims, 1 Drawing Sheet

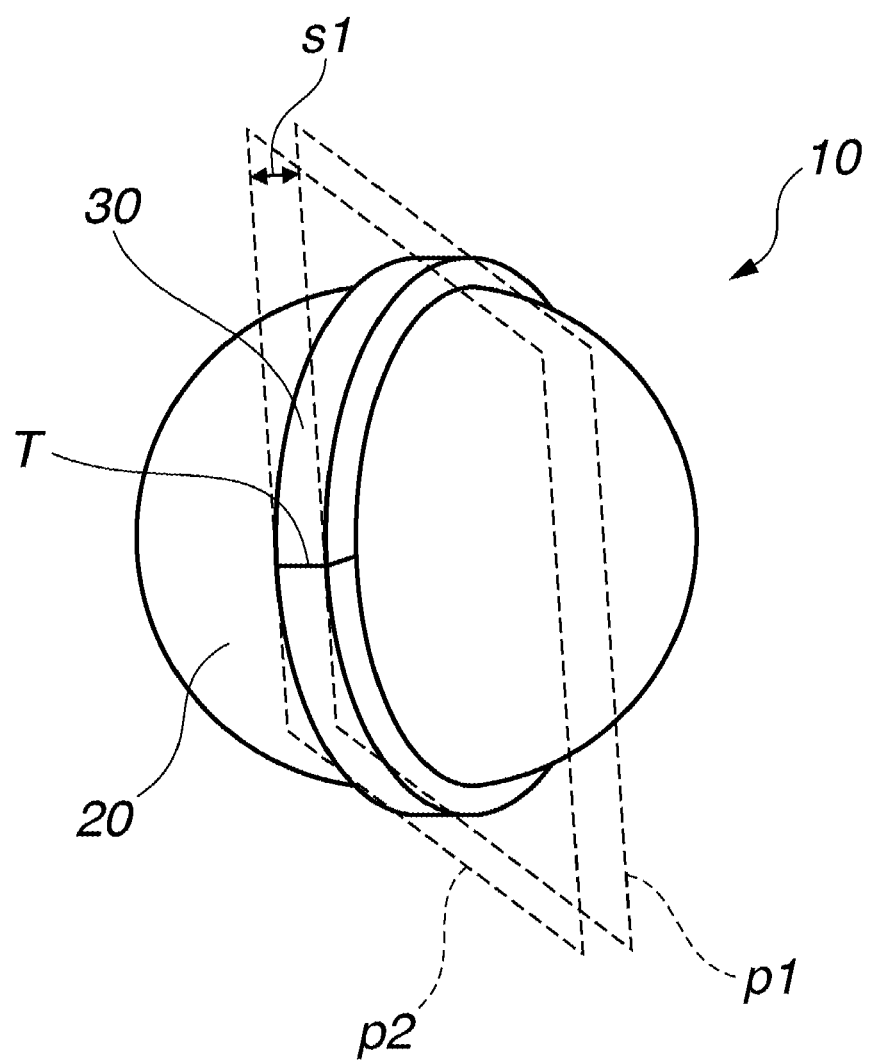

RESIN COMPOSITION FOR GOLF BALLS, AND GOLF BALL

CROSS-REFERENCE TO RELATED APPLICATION

This non-provisional application claims priority under 35 U.S.C. § 119(a) on Patent Application No. 2017-122257 filed in Japan on Jun. 22, 2017, the entire contents of which are hereby incorporated by reference.

TECHNICAL FIELD

This invention relates to a resin composition for golf balls and to a golf ball that uses the resin composition. More particularly, the invention relates to a golf ball in which adhesion between adjoining cover layers is increased, providing the ball with an excellent scuff resistance without lowering its initial velocity.

BACKGROUND ART

Conventional golf balls generally have a cover structure that is formed by injection molding a material composed primarily of an ionomer resin over a core made chiefly of a diene rubber. In recent years, to improve the feel of the ball at impact and the scuff resistance on approach shots, golf balls having a cover composed primarily of a urethane material such as a thermoplastic polyurethane elastomer have become more common.

When a urethane material is used as the cover, a good feel on impact and a high scuff resistance can be obtained. However, compared with ionomer resins, adhesion to the diene rubber serving as the chief ingredient of the core may be poor and, when the ball is repeatedly struck, adherence to the core surface may worsen. Also, in golf balls having a plurality of cover layers, the adhesive properties between urethane and ionomer resin and the adhesion with neighboring cover layers are also important. When the adhesion between layers of the golf ball is poor, this may invite declines in various ball properties, such as the distance, spin rate on approach shots, feel on impact, durability to cracking and scuff resistance. Hence, there exists a desire to improve the adhesion between layers.

Art for improving adhesion between the layers of a golf ball has been disclosed in a number of patent publications, one of which, JP-A H5-68724, describes the inclusion of an oxazoline group-containing thermoplastic resin in an ionomer resin-based cover material. This patent publication mentions that when an oxazoline group-containing thermoplastic resin is mixed into an ionomer resin under applied heat, the oxazoline groups in the thermoplastic resin react with carboxyl groups in the ionomer resin, causing the oxazoline group-containing thermoplastic resin to graft onto the surface of the ionomer resin, thus forming a compatible mixed system, or "polymer alloy," of the oxazoline group-containing thermoplastic resin microdispersed within the ionomer resin. Synergistic improvements in the physical properties of this polymer alloy enable the toughness of the ionomer resin to be further improved, as a result of which the golf ball has an increased durability.

However, the golf ball of the foregoing art includes an oxazoline group-containing thermoplastic resin in a resin composition composed primarily of an ionomer resin; it is not art relating to a resin composition for golf balls that is composed primarily of a polyurethane material and used for the purpose of obtaining a high scuff resistance.

Moreover, with regard to the golf ball resin compositions made up primarily of a urethane material such as a thermoplastic polyurethane elastomer that have hitherto been used, there also exists a desire to achieve an even higher scuff resistance while retaining, for example, a good ball flight performance, a good spin performance and a good feel on impact.

SUMMARY OF THE INVENTION

It is therefore an object of the present invention to provide a golf ball resin composition which can impart golf balls with a good adhesion between adjoining layers therein and with a high scuff resistance. A further object of the invention is to provide a golf ball that uses such a resin composition.

As a result of extensive investigations, we have discovered that, in a golf ball resin composition made up primarily of polyurethane or polyurea, by including an oxazoline group-containing acrylic polymer or an oxazoline group-containing styrene polymer as a novel compounding ingredient, the oxazoline groups in this oxazoline group-containing polymer crosslink due to chemical bonding with, for example, urethane bonds on the polyurethane or other base polymer, thereby enabling the crosslink density of the overall resin composition to be increased, and moreover crosslink due to chemical bonding with carboxyl groups and the like in the base resins of adjoining layers, thus improving adhesion between the layers of the golf ball and also enabling a high scuff resistance to be obtained without lowering the initial velocity of the ball.

Accordingly, in one aspect, the invention provides a resin composition for golf balls which includes (A) polyurethane or polyurea and (B) an oxazoline group-containing acrylic polymer or an oxazoline group-containing styrene polymer, wherein component (B) is included in an amount of from 0.3 to 30 parts by weight per 100 parts by weight of component (A).

The acrylic polymer or styrene polymer of component (B) preferably has a number-average molecular weight (Mn) of from 1,000 to 100,000 and a weight-average molecular weight (Mw) of from 1,000 to 250,000.

Component (B) is preferably included in an amount of from 2 to 15 parts by weight per 100 parts by weight of component (A).

In a preferred embodiment, the resin composition of the invention further includes (C) a material having functional groups which react with oxazoline groups.

Component (C) is preferably at least one selected from the group consisting of polyesters, polyamides, olefin-unsaturated carboxylic acid random copolymers, olefin-unsaturated carboxylic acid-unsaturated carboxylic acid ester random copolymers, metal ion neutralization products of olefin-unsaturated carboxylic acid random copolymers, and metal ion neutralization products of olefin-unsaturated carboxylic acid-unsaturated carboxylic acid ester random copolymers.

Component (C) is preferably included in an amount of from 0.3 to 30 parts by weight per 100 parts by weight of component (A).

In a second aspect, the invention provides a golf ball having a core and a cover of one or more layers which encases the core, wherein at least one layer of the cover is formed of the resin composition according to the first aspect of the invention.

In a preferred embodiment of the golf ball of the invention, a layer adjoining the cover layer formed of the resin composition according to the first aspect of the invention is formed of a composition which includes (D) a material having functional groups which react with oxazoline groups.

In another preferred embodiment of the inventive golf ball, component (D) is at least one selected from the group consisting of polyesters, polyamides, olefin-unsaturated carboxylic acid random copolymers, olefin-unsaturated carboxylic acid-unsaturated carboxylic acid ester random copolymers, metal ion neutralization products of olefin-unsaturated carboxylic acid random copolymers, metal ion neutralization products of olefin-unsaturated carboxylic acid-unsaturated carboxylic acid ester random copolymers, α,β-unsaturated carboxylic acids of 3 to 8 carbon atoms, and metal salts of α,β-unsaturated carboxylic acids of 3 to 8 carbon atoms.

In yet another preferred embodiment of the inventive golf ball, a layer adjoining the cover layer formed of the resin composition according to the first aspect of the invention is formed of a composition containing component (D) which differs from component (C).

Advantageous Effects of the Invention

Golf balls which use the resin composition of the invention have a good adhesion between adjoining layers, enabling a high scuff resistance to be achieved without lowering the initial velocity of the ball.

BRIEF DESCRIPTION OF THE DIAGRAMS

FIG. 1 is a diagram showing a test specimen used for measuring the adhesion strength between cover layers (the intermediate layer and the outermost layer) of a golf ball.

DESCRIPTION OF THE PREFERRED EMBODIMENTS

The objects, features and advantages of the invention will become more apparent from the following detailed description taken in conjunction with the appended diagram.

The resin composition for golf balls according to the invention includes the following components (A) and (B):
(A) polyurethane or polyurea, and
(B) an oxazoline group-containing acrylic polymer or an oxazoline group-containing styrene polymer.
The polyurethane or polyurea in component (A) is described below.
(A) Polyurethane The polyurethane has a structure which includes soft segments composed of a polymeric polyol (polymeric glycol) that is a long-chain polyol, and hard segments composed of a chain extender and a polyisocyanate. Here, the long-chain polyol serving as a starting material may be any that has hitherto been used in the art relating to thermoplastic polyurethanes, and is not particularly limited. This is exemplified by polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. Specific examples of polyester polyols that may be used include adipate-type polyols such as polyethylene adipate glycol, polypropylene adipate glycol, polybutadiene adipate glycol and polyhexamethylene adipate glycol; and lactone-type polyols such as polycaprolactone polyol. Examples of polyether polyols include poly(ethylene glycol), poly(propylene glycol), poly(tetramethylene glycol) and poly(methyltetramethylene glycol). Such long-chain polyols may be used singly, or two or more may be used in combination.

It is preferable for the long-chain polyol to have a number-average molecular weight in the range of 1,000 to 5,000. By using a long-chain polyol having a number-average molecular weight in this range, golf balls made with a polyurethane composition that has various excellent properties, including resilience and productivity, can be obtained. The number-average molecular weight of the long-chain polyol is more preferably in the range of 1,500 to 4,000, and even more preferably in the range of 1,700 to 3.500. As used herein, "number-average molecular weight" refers to the number-average molecular weight calculated based on the hydroxyl value measured in accordance with JIS-K1557 (the same applies below).

The chain extender is not particularly limited; any chain extender that has hitherto been employed in the art relating to thermoplastic polyurethanes may be suitably used. For example, low-molecular-weight compounds with a molecular weight of 2,000 or less which have on the molecule two or more active hydrogen atoms capable of reacting with isocyanate groups may be used. Of these, preferred use can be made of aliphatic diols having from 2 to 12 carbon atoms. Specific examples include 1,4-butylene glycol, 1,2-ethylene glycol, 1,3-butanediol, 1,6-hexanediol and 2,2-dimethyl-1,3-propanediol. Of these, the use of 1,4-butylene glycol is especially preferred.

Any polyisocyanate hitherto employed in the art relating to thermoplastic polyurethanes may be suitably used without particular limitation as the polyisocyanate. For example, use may be made of one or more selected from the group consisting of 4,4'-diphenylmethane diisocyanate, 2,4-toluene diisocyanate, 2,6-toluene diisocyanate, p-phenylene diisocyanate, xylylene diisocyanate, 1,5-naphthylene diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate, 1,4-bis(isocyanatomethyl)cyclohexane and dimer acid diisocyanate.

The ratio of active hydrogen atoms to isocyanate groups in the above polyurethane-forming reaction may be suitably selected. Specifically, in preparing a thermoplastic polyurethane by reacting the above long-chain polyol, polyisocyanate and chain extender, it is desirable to use the respective components in proportions such that the amount of isocyanate groups included in the polyisocyanate per mole of active hydrogen atoms on the long-chain polyol and the chain extender is from 0.95 to 1.05 moles.

The method for preparing the thermoplastic polyurethane is not particularly limited. Preparation using the long-chain polyol, chain extender and polyisocyanate may be carried out by either a prepolymer process or a one-shot process via a known urethane-forming reaction. Of these, melt polymerization in the substantial absence of solvent is preferred. Production by continuous melt polymerization using a multiple screw extruder is especially preferred.

A commercial product may be suitably used as the polyurethane material. Illustrative examples include Pandex T7298, TR3080, T8230, T8283, T8290, T8295 and T8260 (available from DIC Covestro Polymer, Ltd.), and Resamine 2593 and 2597 (available from Dainichiseika Color & Chemicals Mfg. Co., Ltd.). These may be used singly, or two or more may be used in combination.
(A) Polyurea The polyurea is a resin composition composed primarily of urea linkages formed by reacting (i) an isocyanate with (ii) an amine-terminated compound. This resin composition is described in detail below.

(i) Isocyanate

The isocyanate is preferably one that is used in the prior art relating to thermoplastic polyurethanes, but is not particularly limited. Use may be made of isocyanates similar to those mentioned above in connection with the polyurethane material.

(ii) Amine-Terminated Compound

An amine-terminated compound is a compound having an amino group at the end of the molecular chain. In this invention, the long-chain polyamines and/or amine curing agents shown below may be used.

A long-chain polyamine is an amine compound which has on the molecule at least two amino groups capable of reacting with isocyanate groups, and which has a number-average molecular weight of from 1,000 to 5,000. In this invention, the number-average molecular weight is more preferably from 1,500 to 4,000, and even more preferably from 1,900 to 3,000. Within this average molecular weight range, an even better resilience and productivity are obtained. Examples of such long-chain polyamines include, but are not limited to, amine-terminated hydrocarbons, amine-terminated polyethers, amine-terminated polyesters, amine-terminated polycarbonates, amine-terminated polycaprolactones, and mixtures thereof. These long-chain polyamines may be used singly, or as combinations of two or more thereof.

An amine curing agent is an amine compound which has on the molecule at least two amino groups capable of reacting with isocyanate groups, and which has a number-average molecular weight of less than 1,000. In this invention, the number-average molecular weight is more preferably less than 800, and even more preferably less than 600. Such amine curing agents include, but are not limited to, ethylenediamine, hexamethylenediamine, 1-methyl-2,6-cyclohexyldiamine, tetrahydroxypropylene ethylenediamine, 2,2,4- and 2,4,4-trimethyl-1,6-hexanediamine, 4,4'-bis(sec-butylamino)dicyclohexylmethane, 1,4-bis(sec-butylamino)cyclohexane, 1,2-bis(sec-butylamino)cyclohexane, derivatives of 4,4'-bis(sec-butylamino)dicyclohexylmethane, 4,4'-dicyclohexylmethanediamine, 1,4-cyclohexane bis(methylamine), 1,3-cyclohexane bis(methylamine), diethylene glycol di(aminopropyl) ether, 2-methylpentamethylenediamine, diaminocyclohexane, diethylenetriamine, triethylenetetramine, tetraethylenepentamine, propylenediamine, 1,3-diaminopropane, dimethylaminopropylamine, diethylaminopropylamine, dipropylenetriamine, imidobis(propylamine), monoethanolamine, diethanolamine, triethanolamine, monoisopropanolamine, diisopropanolamine, isophoronediamine, 4,4'-methylenebis(2-chloroaniline), 3,5-dimethylthio-2,4-toluenediamine, 3,5-dimethylthio-2,6-toluenediamine, 3,5-diethylthio-2,4-toluenediamine, 3,5-diethylthio-2,6-toluenediamine, 4,4'-bis(sec-butylamino)diphenylmethane and derivatives thereof, 1,4-bis(sec-butylamino)benzene, 1,2-bis(sec-butylamino)benzene, N,N'-dialkylaminodiphenylmethane, N,N,N',N'-tetrakis(2-hydroxypropyl)ethylenediamine, trimethylene glycol di-p-aminobenzoate, polytetramethylene oxide di-p-aminobenzoate, 4,4'-methylenebis(3-chloro-2,6-diethyleneaniline), 4,4'-methylenebis(2,6-diethylaniline), m-phenylenediamine, p-phenylenediamine and mixtures thereof. These amine curing agents may be used singly or as combinations of two or more thereof.

(iii) Polyol

Although not an essential component, in addition to the above-described components (i) and (ii), a polyol may also be included in the polyurea. In this invention, the polyol is not particularly limited, but is preferably one that has hitherto been used in the art relating to thermoplastic polyurethanes. Specific examples include the long-chain polyols and/or polyol curing agents mentioned below.

The long-chain polyol may be any that has hitherto been used in the art relating to thermoplastic polyurethanes. Examples include, but are not limited to, polyester polyols, polyether polyols, polycarbonate polyols, polyester polycarbonate polyols, polyolefin-based polyols, conjugated diene polymer-based polyols, castor oil-based polyols, silicone-based polyols and vinyl polymer-based polyols. These long-chain polyols may be used singly or as combinations of two or more thereof.

The long-chain polyol has a number-average molecular weight of preferably from 1.000 to 5,000, and more preferably from 1,700 to 3,500. In this average molecular weight range, an even better resilience and productivity are obtained.

The polyol curing agent is preferably one that has hitherto been used in the art relating to thermoplastic polyurethanes, but is not subject to any particular limitation. In this invention, use may be made of a low-molecular-weight compound having on the molecule at least two active hydrogen atoms capable of reacting with isocyanate groups, and having a molecular weight of less than 1,000. Of these, the use of aliphatic diols having from 2 to 12 carbons is preferred. Specific examples include 1,4-butylene glycol, 1,2-ethylene glycol, 1,3-butanediol, 1,6-hexanediol and 2,2-dimethyl-1, 3-propanediol. The use of 1,4-butylene glycol is especially preferred. The polyol curing agent has a number-average molecular weight of preferably less than 800, and more preferably less than 600.

A known method may be used to produce the polyurea. A prepolymer process, a one-shot process or some other known method may be suitably selected for this purpose.

The proportion of the overall resin composition accounted for by the polyurethane or polyurea serving as above component (A) is not particularly limited, but may be set to preferably at least 60 wt %, more preferably at least 70 wt %, and even more preferably at least 80 wt %.

Next, component (B) is described. Component (B) is an oxazoline group-containing acrylic polymer or an oxazoline group-containing styrene polymer. The oxazoline groups on component (B) chemically bond with urethane bonds or urea bonds on the polyurethane of component (A) that has decomposed under heat or the like, enhancing the crosslink density of the resin material and making its mechanical properties more robust. Hence, when employed in the outermost layer, component (B) can improve the scuff resistance. In addition, it chemically bonds with carboxyl groups and the like in the adjoining core and cover layers, enabling it to strongly adhere to the adjoining layers.

The acrylic polymer or styrene polymer of component (B) has a number-average molecular weight (Mn) that is preferably from 1,000 to 100,000, and more preferably from 10,000 to 80,000. The acrylic polymer or styrene polymer of component (B) has a weight-average molecular weight (Mw) that is preferably from 1,000 to 250,000, and more preferably from 30,000 to 200,000. Outside of this range in the molecular weight, the compatibility with component (A) may worsen and the durability of the ball may decline. The weight-average molecular weight (Mw) and number-average molecular weight (Mn) are polystyrene-equivalent measured values obtained by gel permeation chromatography (GPC) using differential refractometry.

From the standpoint of achieving both the desired adhesive effect with adjoining layers and the desired durability of the invention, the oxazoline group content within the acrylic polymer or styrene polymer of component (B) is preferably from $0.1 \times 10^{-3}$ to $10 \times 10^{-3}$ mol/g (solids), and especially from $0.2 \times 10^{-3}$ to $8 \times 10^{-3}$ mol/g (solids), per 1.0 g of the polymer.

Having the amount of component (B) included per 100 parts by weight of component (A) be preferably from 0.3 to 30 parts by weight, more preferably from 0.5 to 20 parts by weight, and even more preferably from 2 to 15 parts by weight, is desirable for achieving both a good adhesive effect with adjoining layers and a good scuff resistance.

A commercial product may be used as the polymer of component (B). Illustrative examples include the acrylic polymers Epocros WS-500, Epocros WS-300 and Epocros WS-70, all of which are available from Nippon Shokubai Co., Ltd., and the styrene polymer Epocros RPS-1005, also available from Nippon Shokubai Co., Ltd.

Resin ingredients other than components (A) and (B) may be included. For example, use can be made of one or more selected from among polyester elastomers, polyamide elastomers, ionomer resins, styrene block elastomers, hydrogenated styrene-butadiene rubbers, styrene-ethylene/butylene-ethylene block copolymers and modified forms thereof, ethylene-ethylene/butylene-ethylene block copolymers and modified forms thereof, styrene-ethylene/butylene-styrene block copolymers and modified forms thereof, ABS resins, polyacetals, polyethylenes and nylon resins. In particular, for such reasons as the fact that reaction with isocyanate groups results in increased resilience and scuff resistance, the use of polyester elastomers, polyamide elastomers and polyacetals is especially suitable. When such an ingredient is included, the content thereof is selected as appropriate for, e.g., adjusting the hardness, improving the resilience, improving the flow properties and improving adhesion. Although not particularly limited, the content per 100 parts by weight of component (A) may be set to preferably at least 5 parts by weight and preferably not more than 50 parts by weight.

In this invention, the above-described resin composition containing components (A) and (B) preferably also includes: (C) a material having functional groups which react with oxazoline groups. These functional groups in component (C) crosslink with oxazoline groups in component (B), increasing the crosslink density and thus making it possible to obtain an improved scuff resistance.

The functional groups of component (C) that react with oxazoline groups are exemplified by carboxyl groups, thiol groups, phenolic groups and epoxy groups. In this invention, carboxyl groups are preferably used. The material of component (C) having functional groups that react with oxazoline groups is exemplified by resin materials selected from the group consisting of polyesters, polyamides, olefin-unsaturated carboxylic acid random copolymers, olefin-unsaturated carboxylic acid-unsaturated carboxylic acid ester random copolymers, metal ion neutralization products of olefin-unsaturated carboxylic acid random copolymers, metal ion neutralization products of olefin-unsaturated carboxylic acid-unsaturated carboxylic acid ester random copolymers, and phenolic resins. One, two or more of these may be used in combination.

The content of component (C), although not particularly limited, is preferably from 0.3 to 30 parts by weight, more preferably from 2 to 20 parts by weight, and even more preferably from 3 to 15 parts by weight, per 100 parts by weight of component (A). When this content is too high, the scuff resistance may decrease.

The golf ball resin composition of the invention can be obtained by mixing together the above-described components using various types of mixers, such as a kneading-type single-screw or twin-screw extruder, a Banbury mixer, a kneader or a Labo Plastomill.

The golf ball of the invention has, over the core, a cover of one layer or a plurality of layers.

The core may be a single-layer core or a two-layer core having an inner layer and an outer layer, or may be formed as a plurality of layers in some other arrangement.

The core can be formed using a known rubber composition. Preferred examples include, but are not particularly limited to, the rubber compositions formulated as shown below.

The material forming the core may be composed primarily of a rubber material. For example, the core may be formed using a rubber composition which includes, together with a base rubber, such ingredients as a co-crosslinking agent, an organic peroxide, an inert filler, sulfur, an antioxidant and an organosulfur compound.

The use of polybutadiene as the base rubber of the rubber composition is preferred. It is suitable for the polybutadiene used to be one having a cis-1,4 bond content on the polymer chain of preferably at least 80 wt %, more preferably at least 90 wt %, and even more preferably at least 95 wt %. At a content of cis-1,4 bonds among the bonds on the polybutadiene molecule which is too low, the resilience may decrease. The polybutadiene has a content of 1,2-vinyl bonds on the polymer chain of preferably not more than 2 wt %, more preferably not more than 1.7 wt %, and even more preferably not more than 1.5 wt %. At a 1,2-vinyl bond content that is too high, the resilience may decrease.

To obtain a molded and vulcanized rubber composition having a good resilience, the polybutadiene included is preferably one synthesized with a rare-earth catalyst or a group VIII metal compound catalyst. Polybutadiene synthesized with a rare-earth catalyst is especially preferred.

Rubber components other than the above polybutadiene may be included in the rubber composition, insofar as the objects of the invention are attainable. Illustrative examples of rubber components other than the above polybutadiene include other polybutadienes and also other diene rubbers, such as styrene-butadiene rubber, natural rubber, isoprene rubber and ethylene-propylene-diene rubber.

Examples of co-crosslinking agents include unsaturated carboxylic acids and the metal salts of unsaturated carboxylic acids. Specific examples of unsaturated carboxylic acids include acrylic acid, methacrylic acid, maleic acid and fumaric acid. The use of acrylic acid or methacrylic acid is especially preferred. Metal salts of unsaturated to carboxylic acids include, without particular limitation, the above unsaturated carboxylic acids that have been neutralized with desired metal ions. Specific examples include the zinc salts and magnesium salts of methacrylic acid and acrylic acid. The use of zinc acrylate is especially preferred.

The unsaturated carboxylic acid and/or metal salt thereof is included in an amount, per 100 parts by weight of the base rubber, which may be set to preferably at least 5 parts by weight, more preferably at least 10 parts by weight, and even more preferably at least 15 parts by weight. The amount included may be set to preferably not more than 60 parts by weight, more preferably not more than 50 parts by weight, and even more preferably not more than 45 parts by weight. Too much may make the core too hard, giving the ball an unpleasant feel at impact, whereas too little may lower the rebound.

The organic peroxide may be a commercially available product, specific examples of which include those available under the trade names Percumyl D, Perhexa 3M, Perhexa C-40, Niper BW and Peroyl L (all from NOF Corporation), and Luperco 231XL (from Atochem Co.). One of these may be used alone, or two or more may be used together.

The amount of organic peroxide included per 100 parts by weight of the base rubber is preferably at least 0.1 part by weight, more preferably at least 0.3 part by weight, even more preferably at least 0.5 part by weight, and most preferably at least 0.7 part by weight. The upper limit is preferably not more than 5 parts by weight, more preferably not more than 4 parts by weight, even more preferably not more than 3 parts by weight, and most preferably not more than 2 parts by weight. When too much or too little is included, it may not be possible to obtain a ball having a good feel, durability and rebound.

Examples of preferred inert fillers include zinc oxide, barium sulfate and calcium carbonate. One of these may be used alone, or two or more may be used together.

The amount of inert filler included per 100 parts by weight of the base rubber is preferably at least 1 part by weight, and more preferably at least 5 parts by weight. The upper limit in the amount included is preferably not more than 100 parts by weight, more preferably not more than 80 parts by weight, and even more preferably not more than 60 parts by weight. Too much or too little inert filler may make it impossible to obtain a proper weight and a good rebound.

In addition, an antioxidant may be optionally included. Illustrative examples of suitable commercial antioxidants include Nocrac NS-6, Nocrac NS-30 and Nocrac 200 (all available from Ouchi Shinko Chemical Industry Co., Ltd.), and Yoshinox 425 (available from Yoshitomi Pharmaceutical Industries. Ltd.). One of these may be used alone, or two or more may be used together.

The amount of antioxidant included can be set to more than 0, and may be set to an amount per 100 parts by weight of the base rubber which is preferably at least 0.05 part by weight, and more preferably at least 0.1 part by weight. The maximum amount included, although not particularly limited, may be set to an amount per 100 parts by weight of the base rubber which is preferably not more than 3 parts by weight, more preferably not more than 2 parts by weight, even more preferably not more than 1 part by weight, and most preferably not more than 0.5 part by weight. Too much or too little antioxidant may make it impossible to achieve a suitable core hardness gradient, a good rebound and durability, and a good spin rate-reducing effect on full shots.

An organosulfur compound may be optionally included in the rubber composition in order to enhance the core resilience. In cases where an organosulfur compound is included, the content thereof per 100 parts by weight of the base rubber may be set to preferably at least 0.05 part by weight, and more preferably at least 0.1 part by weight. The upper limit in the organosulfur compound content may be set to preferably not more than 5 parts by weight, more preferably not more than 4 parts by weight, and even more preferably not more than 2 parts by weight. Including too little organosulfur compound may make it impossible to obtain a sufficient core rebound-increasing effect. On the other hand, when too much is included, the core hardness may become too low, worsening the feel of the ball at impact, and the durability of the ball to cracking on repeated impact may worsen.

The rubber composition containing the various above ingredients is prepared by mixture using a typical mixing apparatus, such as a Banbury mixer or a roll mill. When this rubber composition is used to mold the core, molding may be carried out by compression molding or injection molding using a specific mold for molding cores. The resulting molded body is then heated and cured under temperature conditions sufficient for the organic peroxide and co-crosslinking agent included in the rubber composition to act, thereby giving a core having a specific hardness profile. The vulcanization conditions in this case are not particularly limited, although the vulcanization is typically set to from about 130° C. to about 170° C.

The diameter of the core, although not particularly limited, is preferably at least 20 mm, more preferably at least 25 mm, and even more preferably at least 30 mm, but is preferably not more than 41 mm, and more preferably not more than 40 mm.

The deflection of the core, expressed as the deformation when compressed under a final load of 1,275 N (130 kgf) from an initial load of 98 N (10 kgf), is preferably at least 2.0 mm, more preferably at least 2.5 mm, and even more preferably at least 2.7 mm, but is preferably not more than 6.0 mm, and more preferably not more than 5.0 mm. When this deformation is too small, the feel of the ball on impact becomes too hard. On the other hand, when this deformation is too large, the feel on impact becomes too soft or the durability of the ball to cracking under repeated impact worsens.

It is desirable for the core to have at least a specific hardness difference between the center hardness and the surface hardness thereof. Setting this hardness difference, expressed in terms of JIS-C hardness, to at least 20 is preferable for obtaining the desired initial velocity, feel on impact, spin properties and durability.

The cover, which is a member that encases the core, is exemplified by a single-layer cover and by covers consisting of a plurality of layers, such as a two-layer cover and a three-layer cover. Each layer of the cover is sometimes called a cover layer; in particular, the inner layer is called the intermediate layer and the outer layer is called the outermost layer. In the case of a three-layer cover, the respective layers are called, in order from the inside: the envelope layer, the intermediate layer, and the outermost layer.

In this invention, at least one layer of the cover is formed of the above-described golf ball resin composition containing components (A) and (B).

Moreover, in this invention, it is preferable for a layer adjoining the cover layer formed of the above-described golf ball resin composition containing components (A). (B) and (C) to be formed of a composition containing: (D) a material having functional groups that react with oxazoline groups. The functional groups of component (D) in this adjoining layer, by crosslinking with oxazoline groups in the oxazoline group-containing polymer serving as component (B) in the above cover layer, are able to strengthen adhesion between the layers. Component (D) is preferably a resin material that differs from component (C). The layer or layers adjoining the above cover layer include not only other cover layers, but also the adjoining core (when the core is composed of a plurality of layers, the outermost core layer).

Component (D) is selected from the group consisting of polyesters, polyamides, olefin-unsaturated carboxylic acid random copolymers, olefin-unsaturated carboxylic acid-unsaturated carboxylic acid ester random copolymers, metal ion neutralization products of olefin-unsaturated carboxylic acid random copolymers, metal ion neutralization products of olefin-unsaturated carboxylic acid-unsaturated carboxylic acid ester random copolymers, phenolic resins, and rubber compositions. One or more of these may be used. When using a rubber composition, it is preferable to employ a rubber composition containing an $\alpha,\beta$-unsaturated carboxylic acid of 3 to 8 carbon atoms and/or a metal salt thereof.

The α,β-unsaturated carboxylic acid of 3 to 8 carbon atoms and/or a metal salt thereof is most preferably zinc acrylate.

For example, when the layer adjoining the cover layer is formed of, as component (D), an acid (carboxyl group)-containing polymer such as an ionomer resin, these carboxyl groups, by crosslinking with oxazoline groups in component (B) included in the above cover layer, are able to increase adhesion between the cover layer and the adjoining layer.

Various additives may be optionally included in the materials that form the respective cover layers. For example, pigments, dispersants, antioxidants, light stabilizers, ultraviolet absorbers and internal mold lubricants may be suitably included.

The thicknesses of the respective layers, although not particularly limited, are preferably at least 0.5 mm, and more preferably at least 0.7 mm, but are preferably not more than 1.2 mm, more preferably not more than 1.1 mm, and even more preferably not more than 0.9 mm.

The hardnesses of the respective layers on the Shore D scale, although not particularly limited, are set to preferably at least 30, and more preferably at least 40, but preferably not more than 75, more preferably not more than 70, and even more preferably not more than 65.

A known method may be used without particular limitation as the method of forming the layers of the cover. For example, use can be made of a method in which a prefabricated core or a sphere composed of the core encased by any of various layers is placed in a mold, and the resin material prepared as described above is injection-molded over the core or layer-encased sphere.

The ball has a deflection, measured as the deformation when the sphere is compressed under a final load of 1,275 N (130 kgf) from an initial load of 98 N (10 kgf), which is preferably at least 2.0 mm, and more preferably at least 2.5 mm, but is preferably not more than 4.0 mm, and more preferably not more than 3.8 mm. When the deformation is too small, the feel of the ball on impact may be too hard. On the other hand, when the deformation is too large, the feel on impact may be too soft or the durability to cracking on repeated impact may worsen.

Numerous dimples of one, two or more types may be formed on the surface of the cover. In addition, various types of coatings may be applied to the cover surface. Given the need for the golf ball to withstand harsh conditions of use, preferred examples of such coatings include two-part curing urethane coatings, especially non-yellowing urethane coatings.

Ball specifications such as the ball mass (weight) and diameter may be set as appropriate according to the Rules of Golf.

EXAMPLES

The following Working Examples and Comparative Examples are provided to illustrate the invention, and are not intended to limit the scope thereof.

Working Examples 1 to 12. Comparative Examples 1 to 5

Using the following rubber composition shown in Table 1 below, which was common to all the examples, solid cores for the respective examples were produced by 15 minutes of vulcanization at 155° C.

TABLE 1

| Rubber composition for core (C1) | Parts by weight |
| --- | --- |
| cis-1,4-Polybutadiene | 100 |
| Zinc acrylate | 27 |
| Zinc oxide | 4.0 |
| Barium sulfate | 16.5 |
| Antioxidant | 0.2 |
| Organic Peroxide (1) | 0.6 |
| Organic Peroxide (2) | 1.2 |
| Zinc salt of pentachlorothiophenol | 0.3 |
| Zinc stearate | 1.0 |

Details on the above core materials are given below.
cis-1,4-Polybutadiene; Available under the trade name "BR01" from JSR Corporation
Zinc acrylate; Available from Nippon Shokubai Co., Ltd.
Zinc oxide: Available from Sakai Chemical Co., Ltd.
Barium sulfate: Available from Sakai Chemical Co., Ltd.
Antioxidant: Available under the trade name "Nocrac NS-6" from Ouchi Shinko Chemical Industry Co., Ltd.
Organic Peroxide (1): Dicumyl peroxide, available under the trade name "Percumyl D" from NOF Corporation
Organic Peroxide (2): A mixture of 1,1-di(tert-butylperoxy) cyclohexane and silica, available under the trade name "Perhexa C-40" from NOF Corporation
Zinc stearate: Available from NOF Corporation
Formation of Cover Layers (Intermediate Layer and Outermost Layer)

Next, intermediate layer-encased spheres were produced by using the resin materials formulated as shown in Tables 2 and 3 below to injection mold a 1.3 mm thick intermediate layer over the 38.5 mm diameter cores obtained above. In each example, an outermost layer having a thickness of 0.8 mm was then injection molded over the intermediate layer-encased sphere using the appropriate resin material formulation in Table 2 or 3, thereby producing a three-piece golf ball. A common arrangement of dimples was formed at this time on the surface of the cover in each Working Example and Comparative Example.

TABLE 2

| Cover composition (pbw) | M-1 | M-2 | M-3 | M-4 | M-5 | M-6 | M-7 | M-8 | M-9 | M-10 |
| --- | --- | --- | --- | --- | --- | --- | --- | --- | --- | --- |
| (A) Polyurethane | 100 | 100 | 100 | 100 | 100 | 100 | 100 | 100 | 100 | |
| (B) Oxazoline-containing polymer | 0.5 | 0.5 | 0.5 | 3 | 3 | 3 | 3 | 10 | 10 | |
| (C) Polyester elastomer | 3 | 12 | | | 3 | 12 | | 3 | 12 | |
| (C) Acid copolymer | | | | | | | 12 | | | |
| (D) | | | | | | | | | | 100 |

TABLE 3

| Cover composition (pbw) | | M-11 | M-12 | M-13 | M-14 | M-15 | M-16 | N-1 |
|---|---|---|---|---|---|---|---|---|
| (A) | Polyurethane | 100 | 100 | 100 | 100 | 100 | 100 | |
| (B) | Oxazoline-containing polymer | | | 0.2 | 0.2 | 3 | | |
| (C) | Polyester elastomer | | 3 | | 3 | 25 | 12 | |
| (D) | Na-based ionomer | | | | | | | 50 |
| | Zn-based ionomer | | | | | | | 50 |

Details on the ingredients mentioned in the tables are given below.
(B) Oxazoline-containing polymer: The styrene polymer Epocros RPS 1005 (oxazoline group content, 0.27 mmol/g of solids; glass transition temperature, 109° C.; number-average molecular weight (Mn), 70,000, weight-average molecular weight (Mw), 160,000), available from Nippon Shokubai Co., Ltd.
(C) Polyester elastomer: Hytrel 4001, from DuPont-Toray Co., Ltd.
(C), (D) Acid copolymer: An ethylene-unsaturated carboxylic acid copolymer having an acid content of 8 wt %
(D) Na-Based ionomer: The sodium neutralization product of an ethylene-unsaturated carboxylic acid copolymer having an acid content of 18 wt %
(D) Zn-Based ionomer: The zinc neutralization product of an ethylene-unsaturated carboxylic acid copolymer having an acid content of 15 wt %
(A) Polyurethane: A resin material formulated as shown in Table 4 below.

TABLE 4

| Polyurethane resin formulation | Parts by weight |
|---|---|
| T-8290 | 75 |
| T-8283 | 25 |
| Titanium oxide | 3.5 |
| Isocyanate compound | 7.5 |

Trade names for the chief materials in Table 4 are given below.
T-8290, T-8283: Ether-type thermoplastic polyurethanes available under the trade name Pandex from DIC Covestro Polymer, Ltd.
Isocyanate compound: 4,4'-Diphenylmethane diisocyanate Various properties of the resulting golf balls, including the diameters and deformation under specific loading (deflection) of the core, intermediate layer-encased sphere and ball, were evaluated by the methods described below. The results are shown in Tables 5 and 6. In addition, the initial velocity, adhesion and scuff resistance of the golf balls produced in the respective examples were evaluated by the following methods. Those results are likewise presented in Tables 5 and 6.

Diameter of Core and Intermediate Layer-Encased Sphere

The diameters at five random places on the surface were measured at a temperature of 23.9±1° C. and, using the average of these measurements as the measured value for a single core or intermediate layer-encased sphere, the average diameter for five measured specimens was determined.

Ball Diameter

The diameters at five random dimple-free areas on the surface were measured at a temperature of 23.9±1° C. and, using the average of these measurements as the measured value for a single ball, the average diameter for five measured balls was determined.

Ball Deflection

The ball was placed on a hard plate and the amount of deflection when compressed under a final load of 1,275 N (130 kgf) from an initial load of 98 N (10 kgf) was measured. The amount of deflection here refers to the measured value obtained after holding the specimen isothermally at 23.9° C.

Initial Velocity of Ball

The initial velocity was measured using an initial velocity measuring apparatus of the same type as the USGA drum rotation-type initial velocity instrument approved by the R&A. The ball was temperature-conditioned for at least 3 hours at a temperature of 23±1° C., and then tested in a chamber at a room temperature of 23±2° C. Ten balls were each hit twice, the time taken for the ball to traverse a distance of 6.28 g (1.91 m) was measured, and the initial velocity was calculated. The initial velocity results shown in Tables 5 and 6 are values relative to an arbitrary index of 100 for the initial velocity measured in Comparative Example 1.

Adhesion Strength

Referring to FIG. 1, letting p1 be a plane at a distance of 2 mm from the center of a golf ball 10 and p2 be a plane having point symmetry with p1 through the ball center, the adhesion strength between the outermost layer 30 and the intermediate layer 20 was measured in the ball region s1 between the two planes p1 and p2. First, cuts T were made in the outermost layer 30 of the ball where p1 and p2 respectively intersect the outermost layer 30, and those portions of the outermost layer 30 other than s1 were peeled off. Next, a cut T perpendicular to p1 and p2 was made in the outermost layer 30 and, starting at this cut, about 20 mm of the outermost layer 30 was peeled from the intermediate layer 20, thereby obtaining a test specimen having a partially peeled strip thereon for gripping. The test was then carried out by gripping the strip provided in the outermost layer 30 with the movable clamp of a tensile tester. A test specimen-immobilizing fixture allows the test specimen to rotate while maintaining its center position, enabling the outermost layer 30 wrapped around the intermediate layer 20 to be peeled off without slack as the clamp moves away. Based on JIS K6256 ("Adhesion Test Method for Vulcanized Rubber and Thermoplastic Rubber"), the movable clamp of the tensile tester was moved at a speed of 50 mm/min and the tensile strength was measured at 0.1 mm intervals. The tensile strengths over an approximately 100 mm length of the outermost layer 30 were measured for each of three test specimens, and the average of the measured values for the three specimens was treated as the adhesion strength (units: N). The adhesion strength results shown in Tables 5 and 6 are values relative to an arbitrary index of 100 for the adhesion strength between the outermost layer and the intermediate layer in Comparative Example 1.

When measuring the adhesive strength between the core and the intermediate layer, the intermediate layer was peeled off with, in FIG. 1, the symbol 30 representing the intermediate layer and the symbol 20 representing the core, and measurement was similarly carried out. The adhesion strength results shown in Tables 5 and 6 are values relative to an arbitrary index of 100 for the adhesion strength between the intermediate layer and the core in Comparative Example 5.

Scuff Resistance

The golf balls were held isothermally at 23° C. and five balls of each type were hit at a head speed of 33 m/s using as the club a pitching wedge mounted on a swing robot machine. The damage to the ball from the impact was visually rated based on the following 5-point scale.

5: No damage or substantially no apparent damage.
4: Damage is apparent but so slight as to be of substantially no concern.
3: Surface is slightly frayed.
2: Some fraying of surface or loss of dimples.
1: Dimples completely obliterated in places.

The average score was calculated for each type of ball. The scuff resistances shown in Tables 5 and 6 are values relative to an arbitrary index of 100 for the average score obtained in Comparative Example 1.

TABLE 5

| | | Working Example | | | | | | | | |
|---|---|---|---|---|---|---|---|---|---|---|
| | | 1 | 2 | 3 | 4 | 5 | 6 | 7 | 8 | 9 |
| Construction Layer in which resin composition of invention is used | | 3-piece outermost layer | 3-piece outermost layer | 3-piece outermost layer | 3-piece outermost layer | 3-piece outermost layer | 3-piece outermost layer | 3-piece outermost layer | 3-piece outermost layer | 3-piece intermediate layer |
| Core | Composition | C1 | C1 | C1 | C1 | C1 | C1 | C1 | C1 | C1 |
| | Diameter (mm) | 38.5 | 38.5 | 38.5 | 38.5 | 38.5 | 38.5 | 38.5 | 38.5 | 38.5 |
| | Weight (g) | 34.5 | 34.5 | 34.5 | 34.5 | 34.5 | 34.5 | 34.5 | 34.5 | 34.5 |
| Intermediate layer | Composition | N-1 | N-1 | N-1 | N-1 | N-1 | N-1 | N-1 | M-10 | M-6 |
| Intermediate layer-encased sphere | Diameter (mm) | 41.1 | 41.1 | 41.1 | 41.1 | 41.1 | 41.1 | 41.1 | 41.1 | 41.1 |
| | Weight (g) | 40.6 | 40.6 | 40.6 | 40.6 | 40.6 | 40.6 | 40.6 | 40.6 | 40.6 |
| Outermost layer | Composition | M-1 | M-2 | M-3 | M-4 | M-5 | M-6 | M-7 | M-6 | N-1 |
| Ball | Diameter (mm) | 42.7 | 42.7 | 42.7 | 42.7 | 42.7 | 42.7 | 42.7 | 42.7 | 42.7 |
| | Weight (g) | 45.4 | 45.4 | 45.4 | 45.4 | 45.4 | 45.4 | 45.4 | 45.4 | 45.4 |
| | Deflection (mm) | 2.7 | 2.7 | 2.7 | 2.7 | 2.7 | 2.7 | 2.7 | 2.7 | 2.7 |
| | Initial velocity (index) | 100 | 100 | 100 | 100 | 100 | 100 | 100 | 100 | 100 |
| Adhesion | Outermost layer/ Intermediate layer (index) | 200 | 220 | 180 | 200 | 220 | 250 | 250 | 250 | 250 |
| | Intermediate layer/ Core (index) | — | — | — | — | — | — | — | — | 180 |
| Scuff resistance (index) | | 200 | 200 | 180 | 200 | 250 | 250 | 250 | 250 | 100 |

TABLE 6

| | | Working Example | | | Comparative Example | | | | |
|---|---|---|---|---|---|---|---|---|---|
| | | 10 | 11 | 12 | 1 | 2 | 3 | 4 | 5 |
| Construction Layer in which resin composition of invention is used | | 3-piece outermost layer | 3-piece outermost layer | 3-piece outermost layer | 3-piece outermost layer | 3-piece outermost layer | 3-piece outermost layer | 3-piece outermost layer | 3-piece intermediate layer |
| Core | Composition | C1 | C1 | C1 | C1 | C1 | C1 | C1 | C1 |
| | Diameter (mm) | 38.5 | 38.5 | 38.5 | 38.5 | 38.5 | 38.5 | 38.5 | 38.5 |
| | Weight (g) | 34.5 | 34.5 | 34.5 | 34.5 | 34.5 | 34.5 | 34.5 | 34.5 |
| Intermediate layer | Composition | N-1 | N-1 | N-1 | N-1 | N-1 | N-1 | N-1 | M-16 |
| Intermediate layer-encased sphere | Diameter (mm) | 41.1 | 41.1 | 41.1 | 41.1 | 41.1 | 41.1 | 41.1 | 41.1 |
| | Weight (g) | 40.6 | 40.6 | 40.6 | 40.6 | 40.6 | 40.6 | 40.6 | 40.6 |
| Outermost layer | Composition | M-8 | M-9 | M-15 | M-11 | M-12 | M-13 | M-14 | N-1 |
| Ball | Diameter (mm) | 42.7 | 42.7 | 42.7 | 42.7 | 42.7 | 42.7 | 42.7 | 42.7 |
| | Weight (g) | 45.4 | 45.4 | 45.4 | 45.4 | 45.4 | 45.4 | 45.4 | 45.4 |
| | Deflection (mm) | 2.7 | 2.7 | 2.7 | 2.7 | 2.7 | 2.7 | 2.7 | 2.7 |
| | Initial velocity (index) | 100 | 100 | 100 | 100 | 100 | 100 | 100 | 100 |
| Adhesion | Outermost layer/ Intermediate layer (index) | 250 | 250 | 230 | 100 | 100 | 110 | 110 | 100 |
| | Intermediate layer/ Core (index) | — | — | — | — | — | — | — | 100 |
| Scuff resistance (index) | | 250 | 250 | 190 | 100 | 100 | 110 | 120 | 100 |

The results in Tables 5 and 6 demonstrate that the golf balls obtained in Working Examples 1 to 12 all had good scuff resistances and, moreover, adhesion with the adjoining layer (intermediate layer or core) was satisfactory. By contrast, because the golf balls obtained in both Comparative Examples 1 and 2 contained no component (B), the scuff resistance was not good and adhesion with the intermediate layer was inadequate. In both Comparative Examples 3 and 4, because the content of component (B) was low, the scuff resistance was poor and adhesion with the intermediate layer was inadequate. Comparative Example 5 is an example in which component (B) was not included in the intermediate layer material. As a result, adhesion with, as the adjoining layers, the outermost layer and the core was found to be inadequate.

Japanese Patent Application No. 2017-122257 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a core and a cover of one or more layers which encases the core, wherein at least one layer of the cover is a resin composition layer formed of a resin composition, comprising:
   (A) polyurethane or polyurea, and
   (B) an oxazoline group-containing acrylic polymer or an oxazoline group-containing styrene polymer,
   wherein component (B) is included in an amount of from 0.3 to 30 parts by weight per 100 parts by weight of component (A); and
   wherein a layer adjoining the resin composition layer is formed of a composition further comprising (D) a material having functional groups which react with oxazoline groups.

2. The golf ball of claim 1, wherein component (D) is at least one selected from the group consisting of polyesters, polyamides, olefin-unsaturated carboxylic acid random copolymers, olefin-unsaturated carboxylic acid-unsaturated carboxylic acid ester random copolymers, metal ion neutralization products of olefin-unsaturated carboxylic acid random copolymers, metal ion neutralization products of olefin-unsaturated carboxylic acid-unsaturated carboxylic acid ester random copolymers, α,β-unsaturated carboxylic acids of 3 to 8 carbon atoms, and metal salts of α,β-unsaturated carboxylic acids of 3 to 8 carbon atoms.

3. The golf ball of claim 2, wherein the resin composition layer further comprises (C) a material having functional groups which react with oxazoline groups that is at least one selected from the group consisting of polyesters, polyamides, olefin-unsaturated carboxylic acid random copolymers, olefin-unsaturated carboxylic acid-unsaturated carboxylic acid ester random copolymers, metal ion neutralization products of olefin-unsaturated carboxylic acid random copolymers, and metal ion neutralization products of olefin-unsaturated carboxylic acid-unsaturated carboxylic acid ester random copolymers, and wherein a layer adjoining the resin composition layer is formed of a composition containing component (D) which differs from component (C).

4. The resin composition of claim 1, wherein the acrylic polymer or styrene polymer of component (B) has a number-average molecular weight (Mn) of from 1,000 to 100,000 and a weight-average molecular weight (Mw) of from 1,000 to 250,000.

5. The resin composition of claim 1, wherein component (B) is included in an amount of from 2 to 15 parts by weight per 100 parts by weight of component (A).

6. The resin composition of claim 1, further comprising (C) a material having functional groups which react with oxazoline groups.

7. The resin composition of claim 6, wherein component (C) is at least one selected from the group consisting of polyesters, polyamides, olefin-unsaturated carboxylic acid random copolymers, olefin-unsaturated carboxylic acid-unsaturated carboxylic acid ester random copolymers, metal ion neutralization products of olefin-unsaturated carboxylic acid random copolymers, and metal ion neutralization products of olefin-unsaturated carboxylic acid-unsaturated carboxylic acid ester random copolymers.

8. The resin composition of claim 6, wherein component (C) is included in an amount of from 0.3 to 30 parts by weight per 100 parts by weight of component (A).

9. A golf ball comprising a core and a cover of one or more layers which encases the core, wherein at least one layer of the cover is a resin composition layer formed of a resin composition, comprising:
   (A) polyurethane or polyurea, and
   (B) an oxazoline group-containing acrylic polymer or an oxazoline group-containing styrene polymer,
   wherein component (B) is included in an amount of from 0.3 to 30 parts by weight per 100 parts by weight of component (A);
   wherein the acrylic polymer or styrene polymer of component (B) has a number-average molecular weight (Mn) of from 1,000 to 100,000 and a weight-average molecular weight (Mw) of from 1,000 to 250,000.

10. The resin composition of claim 9, wherein component (B) is included in an amount of from 2 to 15 parts by weight per 100 parts by weight of component (A).

11. The resin composition of claim 9, further comprising (C) a material having functional groups which react with oxazoline groups.

12. The resin composition of claim 11, wherein component (C) is at least one selected from the group consisting of polyesters, polyamides, olefin-unsaturated carboxylic acid random copolymers, olefin-unsaturated carboxylic acid-unsaturated carboxylic acid ester random copolymers, metal ion neutralization products of olefin-unsaturated carboxylic acid random copolymers, and metal ion neutralization products of olefin-unsaturated carboxylic acid-unsaturated carboxylic acid ester random copolymers.

13. The resin composition of claim 11, wherein component (C) is included in an amount of from 0.3 to 30 parts by weight per 100 parts by weight of component (A).

* * * * *